United States Patent
Herzog

(10) Patent No.: US 12,064,807 B2
(45) Date of Patent: Aug. 20, 2024

(54) METHOD OF PRODUCING MOLDS AND CORES SUITABLE FOR PRODUCING FIBER COMPOSITE BODIES OR CAST PARTS IN METAL OR PLASTIC, MOLD BASE MATERIAL AND BINDER USED IN THE METHOD AND MOLDS AND CORES PRODUCED ACCORDING TO THE METHOD

(71) Applicant: Reinsicht GmbH, Gerlingen (DE)

(72) Inventor: Ivo Herzog, Gerlingen (DE)

(73) Assignee: Reinsicht GmbH, Gerlingen (DE)

( * ) Notice: Subject to any disclaimer, the term of this patent is extended or adjusted under 35 U.S.C. 154(b) by 1071 days.

(21) Appl. No.: 16/962,301

(22) PCT Filed: Jan. 7, 2019

(86) PCT No.: PCT/EP2019/050233
§ 371 (c)(1),
(2) Date: Jul. 15, 2020

(87) PCT Pub. No.: WO2019/137871
PCT Pub. Date: Jul. 18, 2019

(65) Prior Publication Data
US 2020/0338629 A1 Oct. 29, 2020

(30) Foreign Application Priority Data
Jan. 15, 2018 (DE) .................. 10 2018 200607.5

(51) Int. Cl.
| | |
|---|---|
| *B22C 1/20* | (2006.01) |
| *B22C 1/18* | (2006.01) |
| *B22C 9/10* | (2006.01) |
| *B29C 33/38* | (2006.01) |
| *B29C 64/165* | (2017.01) |
| *B33Y 10/00* | (2015.01) |
| *B33Y 70/10* | (2020.01) |
| *B33Y 80/00* | (2015.01) |
| *C04B 20/10* | (2006.01) |
| *C04B 28/00* | (2006.01) |
| *C04B 28/18* | (2006.01) |
| *B29K 83/00* | (2006.01) |
| *C04B 111/00* | (2006.01) |

(52) U.S. Cl.
CPC .............. *B22C 1/205* (2013.01); *B22C 1/18* (2013.01); *B22C 9/105* (2013.01); *B29C 33/3842* (2013.01); *B29C 64/165* (2017.08); *B33Y 10/00* (2014.12); *B33Y 70/10* (2020.01); *B33Y 80/00* (2014.12); *C04B 20/1051* (2013.01); *C04B 28/008* (2013.01); *C04B 28/182* (2013.01); *B29K 2083/00* (2013.01); *C04B 2111/00181* (2013.01)

(58) Field of Classification Search
CPC .. B22C 9/10; B22C 9/105; B22C 1/18; B22C 1/20; B22C 1/205

USPC .................. 164/369, 6, 15, 23, 24, 520, 525
See application file for complete search history.

(56) References Cited

U.S. PATENT DOCUMENTS

| | | |
|---|---|---|
| 4,162,238 A | 7/1979 | Bergna |
| 5,474,606 A | 12/1995 | Twardowska et al. |
| 5,711,792 A | 1/1998 | Miller |
| 6,972,059 B1 | 12/2005 | Skerdi |
| 10,092,946 B2 | 10/2018 | Bartels et al. |
| 10,722,938 B2 | 7/2020 | Muller et al. |
| 2005/0276976 A1 | 12/2005 | Pfeifer et al. |
| 2006/0251535 A1 | 11/2006 | Pfeifer et al. |
| 2007/0036941 A1 | 2/2007 | Groezinger |
| 2009/0095439 A1 | 4/2009 | Stotzel et al. |
| 2011/0036528 A1 | 2/2011 | Goebbert et al. |
| 2014/0212677 A1 | 7/2014 | Gnüchtel et al. |
| 2017/0036263 A1 | 2/2017 | Nagai et al. |
| 2017/0056963 A1 | 3/2017 | Bartels et al. |
| 2017/0210037 A1 | 7/2017 | Ederer et al. |
| 2017/0240675 A1 | 8/2017 | Yoshimura et al. |
| 2017/0320128 A1 | 11/2017 | Deters et al. |

FOREIGN PATENT DOCUMENTS

| | | |
|---|---|---|
| CN | 101600524 A | 12/2009 |
| CN | 104736270 A | 6/2015 |
| CN | 105312484 A | 2/2016 |
| CN | 106470780 A | 3/2017 |
| CN | 106660266 A | 5/2017 |
| DE | 24 34 431 A1 | 2/1975 |
| DE | 195 25 307 A1 | 1/1997 |

(Continued)

OTHER PUBLICATIONS

Notice of Reason for Rejection dated Jan. 6, 2023, of counterpart Japanese Patent Application No. 2020-559011, along with an English translation.
The First Office Action dated Sep. 28, 2021, of counterpart Chinese Application No. 201980019500.0, along with an English translation.
The Examination Report dated Oct. 5, 2021, counterpart of Indian Application No. 202017033661, along with an English translation.

*Primary Examiner* — Kevin P Kerns

(74) *Attorney, Agent, or Firm* — DLA Piper LLP (US)

(57) ABSTRACT

A method of manufacturing molds and cores suitable for producing fiber composite bodies or cast parts of metal or plastic from a mold base material and a multicomponent binder by 3D printing includes pretreating the particulate mold base material with at least one silicon-organic compound having a polar hydrophilic end and a nonpolar hydrophobic end, forming a layer of the pretreated particulate mold base material, and applying the binder or at least one component of the binder in liquid form to the layer, wherein b. and c. are repeated.

10 Claims, No Drawings

(56) References Cited

FOREIGN PATENT DOCUMENTS

| | | |
|---|---|---|
| DE | 199 25 167 A1 | 12/2000 |
| DE | 103 59 547 B3 | 3/2005 |
| DE | 10 2007 045 649 A1 | 4/2009 |
| DE | 10 2007 063 552 A1 | 6/2009 |
| DE | 10 2014 118 577 A1 | 6/2016 |
| EP | 1 594 679 A2 | 11/2005 |
| GB | 782205 A | 9/1957 |
| IN | 967/KOLNP/2008 | 11/2008 |
| WO | 92/06808 A1 | 4/1992 |
| WO | 2007/025769 A1 | 3/2007 |
| WO | 2011/087564 A1 | 7/2011 |
| WO | 2012/175072 A1 | 12/2012 |
| WO | 2016/019937 A1 | 2/2016 |
| WO | 2016/143051 | 9/2016 |
| WO | WO 2017/044735 A1 * | 3/2017 ............. B33Y 80/00 |

\* cited by examiner

METHOD OF PRODUCING MOLDS AND CORES SUITABLE FOR PRODUCING FIBER COMPOSITE BODIES OR CAST PARTS IN METAL OR PLASTIC, MOLD BASE MATERIAL AND BINDER USED IN THE METHOD AND MOLDS AND CORES PRODUCED ACCORDING TO THE METHOD

TECHNICAL FIELD

This disclosure relates to a method of manufacturing molds and cores, suitable for producing fiber composite bodies or cast parts of metal or plastic, from a particulate mold base material and a multicomponent binder by 3D printing, and also to mold base materials and binders that can be used in the method, and also to molds and cores produced by the method.

BACKGROUND

There are a multiplicity of industrial products that employ components made of metal, of plastic or of a fiber composite material (a composite material comprising a matrix of a plastic embedded into which is a fiber material) that have a cavity within their interior. Producing such components is difficult, especially if the cavity is to have a complex geometry (for example, an elongate, curved shape or a shape with undercuts) while the cavity surface at the same time has to be smooth and of high grade. One possible way of producing such components in one piece is to cast them using what are called "lost molds." With this technique, in an upstream step, a molding part (the "core") is produced, which corresponds in size and shape to the cavity to be formed. The core is placed in a casting tool consisting of further mold parts and into which subsequently a liquid metal, a liquid polymer material or a liquid polymer precursor is injected. In the production of fiber composite bodies, the core is wrapped with a fiber material before being placed in the casting tool. After casting, a fiber composite body or a cast part of metal or plastic is obtained with the desired cavity, albeit with the core still in it. This core is subsequently removed, an operation which is impossible, owing to the aforementioned complex geometry of the cavity, without destroying the core. The core as a mold part is "lost."

It is known practice from metal casting to use cores of inorganic materials such as sand, for example, to produce cavities in cast parts. Cores of that kind can also be used for casting plastics, provided that the core surface is sealed. They are produced from a molding mixture comprising a binder and a suitable particulate inorganic material, called the mold base material. The binder holds the particles of the mold base material together and is therefore responsible for the structural integrity of the cores. The cores must be able to withstand thermal and mechanical loads that occur during a casting procedure. After casting has taken place, the cores are comminuted usually by vibrations. When a water-soluble binder is used as, for example, a binder based on magnesium sulfate, on waterglass or on polyphosphate and/or borate, the cores can also be washed out of the interior of cast parts after the casting procedure.

To produce such cores from inorganic materials, it is usual to produce a molding mixture comprising a refractory mold base material, usually sand, and a binder. This mixture is processed to the desired mold or the desired core in a molding tool. To produce cores, in what is called a core shooting process, a molding mixture is introduced under defined pressure and defined temperature into a core box (a molding tool consisting generally of two mold parts or mold halves, which in the state of use enclose at least one interior cavity in the shape of the core to be manufactured—a "mold cavity"). After the binder has cured, the completed core can be removed from the core box and used as intended.

In recent times, molds and cores have been fabricated more and more frequently by 3D printing as well. A printer that produces 3D components generally possesses at least one movable printing head operating in a manner similar to the printing head of a conventional inkjet printer. Instead of ink, however, this printing head applies usually a liquid binder to a layer of a refractory mold base material. Serving as the data basis may be the individual 2D layers of a 3D model broken down by a computer into these same individual layers.

For the layer-by-layer construction of a mold or a core for the casting plastic or metal by 3D printing, a first layer of the refractory mold base material is placed in a frame. Then the binder is applied via the at least one printing head in a first printing step. The binder bonds individual particles of the mold base material to one another. Expressed in simplified terms, the 3D printer draws a two-dimensional image of a first layer of the 3D component. Thereafter, a second layer of the refractory mold base material is formed on the first layer. In a second printing step, the binder is applied to this layer as well, with the amount of binder being calculated to bond not only particles of the mold base material to one another within the second layer, but also particles of the first layer to particles of the second layer. Layer by layer, the 3D component is built up in this way. Particular attention is needed on the uniform application of the individual layers. Generally speaking, the layers have to be compacted before binder application, this being done, for example, by a roller or vibration.

Suitable apparatuses for producing molds and cores by 3D printing are available commercially. The construction of a 3D printer suitable for producing molds and cores is depicted schematically in FIG. 1 of WO 2016/019937 A1 of Voxeljet AG, for example.

DE 102014118577 A1 discloses a method of producing molds and cores by 3D printing. The binder employed is a mixture of waterglass and at least one phosphate and/or at least one borate, and the mold base material used comprises materials such as silica sand. A curing agent for the binder may have been added to the mold base material.

WO 2012/175072 A1 discloses another method of producing molds and cores by 3D printing. For the layer-by-layer construction of a 3D component, layers of a refractory mold base material are formed, the material having been admixed with a spray-dried alkali metal silicate solution. The solution can be activated using water, which is applied to the layers via a printing head, and it binds particles of the mold base material wetted with the water to one another after a subsequent drying operation.

WO 2011/087564 A1 as well relates to a method of producing molds and cores by 3D printing. A printable mixture is formed from a refractory mold base material, cement and a waterglass, and is used to construct a 3D component layer by layer.

A possible problem arising in the 3D printing of molds and cores is that on application of water-based binders, the binder does not remain directly at the position of its application, but instead sinks due to gravity into lower layers. Furthermore, the binder runs sideways and also bonds individual particles of the mold base material to one another outside the regions that are to be printed. This effect is also known as "fluid migration." Because the times between the printing of successive layers are often too short to allow layers that have already been printed to dry and/or cure to a relevant extent, this problem tends to be exacerbated with the printing of each further layer. Depending on the sorption capacity of the mold base material, this can lead to very marked deviations from the particular geometric stipulations concerning the mold or core to be printed.

There are a number (generally two or more) of factors via which the extent of the fluid migration can be influenced. They are, in particular, the amount and concentration of the binder and also the energy input in the curing of the added binder. Detailed explanations on this topic are found, for example, in Ramakrishnan, Robert, "3-D-Drucken mit einem anorganischen Formstoffsystem" [3D Printing with an inorganic molding material system] from 2016 (submitted on 24 Sep. 2015 at the Technical University Munich, and accepted by the Faculty of Machinery on Jan. 25, 2016; President—Univ.-Prof. Dr.-Ing. Gunther Reinhart, Examiners—Univ.-Prof. Dr.-Ing. Wolfram Volk and Univ.-Prof. Dr. rer. nat. Tim C. Lüth).

It could therefore be helpful to provide a method improved in these respects for providing molds and cores for producing fiber composite bodies or cast parts of metal or plastic by 3D printing.

SUMMARY

I provide a method of manufacturing molds and cores suitable for producing fiber composite bodies or cast parts of metal or plastic from a mold base material and a multicomponent binder by 3D printing, the method including a. pretreating the particulate mold base material with at least one silicon-organic compound having a polar hydrophilic end and a nonpolar hydrophobic end, b. forming a layer of the pretreated particulate mold base material, and c. applying the binder or at least one component of the binder in liquid form to the layer, wherein b. and c. are repeated.

I also provide molds and cores suitable for producing fiber composite bodies or cast parts of metal or plastic wherein the molds and cores have a fraction of the silicon-organic compound of 0.01 to 0.2 wt %; and, optionally, at least one of the molds and cores are produced by the method of manufacturing molds and cores suitable for producing fiber composite bodies or cast parts of metal or plastic from a mold base material and a multicomponent binder by 3D printing, the method including a. pretreating the particulate mold base material with at least one silicon-organic compound having a polar hydrophilic end and a nonpolar hydrophobic end, b. forming a layer of the pretreated particulate mold base material, and c. applying the binder or at least one component of the binder in liquid form to the layer, wherein b. and c. are repeated; the molds and cores include at least one member selected from the group consisting of magnesium sulfate, phosphate and borate in a fraction of 0.3 to 2.5 wt %; and the molds and cores include particulate silicon dioxide in a fraction of 0.1 to 1.0 wt %.

I further provide a particulate mold base material for use in the method of manufacturing molds and cores suitable for producing fiber composite bodies or cast parts of metal or plastic from a mold base material and a multicomponent binder by 3D printing, the method including a. pretreating the particulate mold base material with at least one silicon-organic compound having a polar hydrophilic end and a nonpolar hydrophobic end, b. forming a layer of the pretreated particulate mold base material, and c. applying the binder or at least one component of the binder in liquid form to the layer, wherein b. and c. are repeated, where on its surface, it has at least one silicon-organic compound having a polar hydrophilic end and a nonpolar hydrophobic end.

I also further provide a set for manufacturing molds and cores, suitable for producing fiber composite bodies or cast parts of metal or plastic, from a particulate mold base material and a multicomponent binder by 3D printing, more particularly for use in the method of manufacturing molds and cores suitable for producing fiber composite bodies or cast parts of metal or plastic from a mold base material and a multicomponent binder by 3D printing, the method including a. pretreating the particulate mold base material with at least one silicon-organic compound having a polar hydrophilic end and a nonpolar hydrophobic end, b. forming a layer of the pretreated particulate mold base material, and c. applying the binder or at least one component of the binder in liquid form to the layer, wherein b. and c. are repeated, including at least one silicon-organic compound having a polar hydrophilic end and a nonpolar hydrophobic end, and at least one member selected from the group consisting of waterglass, magnesium sulfate, phosphate and borate, and, optionally, a particulate mold base material, at least one member selected from the group consisting of silicon dioxide and calcium carbonate; and an aqueous hydroxide solution.

DETAILED DESCRIPTION

Our methods of manufacturing molds and cores suitable for producing fiber composite bodies or cast parts of metal or plastic are fabricated by 3D printing from a particulate mold base material and a multicomponent binder. The method always comprises steps:
a. the particulate mold base material is pretreated with at least one silicon-organic compound having a polar hydrophilic end and a nonpolar hydrophobic end,
b. a layer of the pretreated particulate mold base material is formed, and
c. the binder or at least one component of the binder (for short: binder component) is applied in liquid form (in general via one or more printing heads of a 3D printer) to the layer.

In analogy to the known procedure explained above for producing molds and cores by 3D printing, steps b. and c. are multiply repeated. The binder or the at least one component is applied to a first layer of the pretreated base material, followed by formation of a second layer of the pretreated mold base material on the first layer, and followed again by the application of the binder or the binder component. This is repeated until the layer-by-layer construction of the desired mold or core is concluded.

Mold Base Material

The mold base material preferably comprises a particulate material to whose surface the hydrophilic end of the silicon-organic compound is able to attach. The mold base material preferably consists of such a material. The pretreated mold base material consists preferably of the particulate material and of the silicon-organic compound.

Preferably, the particulate material chosen comprises at least one particulate inorganic material that is insoluble (at room temperature) in water. This material is preferably selected from the group of sand, glass, oxidic, ceramic, metallic and glass-ceramic materials, and mixtures of the aforesaid materials.

The sand may be natural or synthetic in origin. Contemplated in particular are silica sand, zircon sand, chromium ore sand, mullite sand and olivine sand.

Suitable glasses include, in particular, inorganic glasses which are chemically inert in their behavior toward water or aqueous solutions, at least in the temperature range of 0° C. to 200° C.

Among the known oxidic materials, particular suitability for the utility is possessed by metal oxides such as aluminum oxide.

Ceramic particles refer in particular to particles of carbides, nitrides, oxides, silicides, and also of known clay minerals such as kaolinite, for example.

The term "glass-ceramics" refers to glasses which have crystalline ceramic particles embedded into an amorphous glass phase.

Particulate material used may additionally or alternatively be hollow microbeads, especially hollow aluminum silicate microbeads and/or hollow glass microbeads, granules, and/or spherical bodies based on glass, ceramic or metals or metal alloys.

It is also possible to employ recycled glass products such as glass granules and expanded glass granules, and also expanded clay, and other inexpensive particulate substances.

The use of low-melting particles such as of a low-melting glass, for example, is usually suitable only when producing molds which serve for the manufacture of fiber composite bodies or cast parts of plastic. For the processing of liquid metals such as of liquid aluminum, for example, molds of these materials are not very suitable. An especially suitable mold base material in these examples is high-temperature-resistant sand, and the ceramic particles mentioned.

The particulate material preferably has a melting point >600° C., preferably >900° C., more preferably >1200° C. and especially preferably >1500° C.

Preferably, the mold base material chosen comprises at least one particulate inorganic material which is soluble (at room temperature) in water. This is preferably a water-soluble salt.

The water-soluble salts that can be used include, in particular, salts from the group with sodium chloride (NaCl), potassium chloride (KCl) and sodium carbonate ($Na_2CO_3$). Also included here are nitrates, especially sodium nitrate ($NaNO_3$) and potassium nitrate ($KNO_3$).

The stated salts are suitable especially for molds for manufacturing fiber composite bodies or cast parts of plastic.

Further preferably, the mold base material chosen comprises at least one particulate organic material which is soluble (at room temperature) in water. This is preferably a water-soluble polymer or a salt of an organic acid such as sodium acetate, for example, or mixtures of these materials, or urea, citric acid or tartaric acid.

These materials are especially suitable for molds for manufacturing fiber composite bodies or cast parts of low-melting plastic.

The particulate mold base material very preferably has a mean particle diameter (d50) of 10 μm to 800 μm, preferably 30 μm to 300 μm.

Additionally, it may be preferable for the particulate mold base material to have a surface area as determined to DIN-ISO 9277 of 50 cm²/g to 500 cm²/g.

The grain size distribution of the mold base material is preferably chosen such that in the cores and molds under production, it leads to a densely packed constellation, corresponding to the Fuller or Litzow grain distributions determined empirically. This is preferably employed to minimize pore spaces to be infiltrated.

Silicon-Organic Compound

The polar hydrophilic end of the silicon organic compound preferably comprises at least one functional group from the group with hydroxy (—OH), hydroxylate (—O—), amino (—$NH_2$), ammonium (—NH4+), carboxyl (—COOH) or carboxylate groups. In particular, the hydrophilic end may also comprise two or more of these groups—for example, therefore, two or more hydroxylate groups.

The nonpolar hydrophobic end of the silicon-organic compound comprises at least one alkyl group, preferably from the group of methyl, ethyl and propyl. Preferably, the hydrophobic end may also comprise two or more alkyl groups.

Particularly preferably, the polar, hydrophilic end and the nonpolar, hydrophobic end are bonded to the same Si atom. In this example, the silicon-organic compound is preferably an alkylsilanolate, more particularly an alkali metal methylsilanolate, more preferably a potassium methylsilanolate.

Further preferably, the silicon-organic compound is tripotassium methylsilanetriolate (empirical formula $CH_3K_3O_3Si$, also known as potassium methylsiliconate).

Further particularly preferably, the nonpolar, hydrophobic end of the silicon-organic compound is bonded to an Si atom and the hydrophilic end is bonded to a C atom. In this example, it is further preferred for the Si atom and the C atom to be connected by a chain having n atoms, where n is an integer between 1 and 150 and the atoms are selected from C atoms and O atoms and Si atoms.

Further preferably, the silicon-organic compound is a compound with structural formula (I):

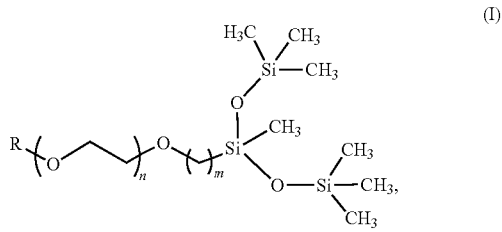

where n is an integer between 1 and 100 and m is an integer between 1 and 10 and R is preferably an H atom.

Particularly preferred for use as silicon-organic compound is 3-(polyoxyethylene)propylheptamethyltrisiloxane.

Pretreated Mold Base Material

For the pretreatment, the particulate mold base material is admixed with the at least one silicon-organic compound. In this example, there is an optimum amount in which the silicon-organic compound is added to the mold base material. If there is too low a fraction, the risk exists of the addition of the silicon-organic compound showing no sufficient effect. If there is too high a fraction, the risk exists of the particulate mold material becoming so greatly hydrophobed that the individual particles of the mold material are no longer able to interact sufficiently with the binder in the course of the subsequent printing operation.

The pretreated mold base material is generally in the form of a free-flowable product.

More preferably, the silicon-organic compound is added to the particulate mold base material in the pretreatment in an amount such that it is present in the pretreated mold base material in a weight fraction of at least 0.001 wt % and of at most 0.1 wt % (based on the dry weight of the pretreatment mold base material). Within this range, a fraction of 0.01 wt % to 0.05 wt % is further preferred. This applies especially where the particulate mold base material used comprises a mold base material having the aforementioned preferred mean particle diameter (d50) of 10 μm to 800 μm and for which the silicon-organic compound is an alkali metal methylsilanolate, more particularly potassium methylsiliconate, or a compound of formula (1), more particularly 3-(polyoxyethylene)propylheptamethyltrisil-oxane.

The amount in which the silicon-organic compound is added to the particulate mold base material also influences the extent to which the fluid migration, mentioned earlier on, occurs. An optimum value for the weight fraction of the silicon-organic compound, more particularly within the stated range of 0.01 wt % and 0.1 wt %, can be ascertained with the aid of experimental studies.

A procedure suitable for this purpose is known from the aforementioned Ramakrishnan publication. It involves the production of standardized test specimens comprising a structure made up of a plurality of concentric rings in accordance with specified printing parameters. After they have been produced, these test specimens are blown off with compressed air at a defined working pressure of 8 bar. The airflow removes unbound particulate material in the interstices of the delicate rings. After this material has been blown out, the weight of the test specimens is ascertained by a precision balance.

The greater the extent of fluid migration, the more material remains in the form of adhesions in the interstices. These adhesions lead to an increase in weight which is measured by the precision balance.

The fluid migration expresses the percentage by which the mass of a test specimen exceeds its intended mass. It can be computed from the density of the disk test specimen and the nominal volume of the test element (from the CAD data). By using the silicon-organic compound, it is possible to produce test specimens whose weight deviates by less than 0.1% from their intended weight.

The silicon-organic compound is preferably attached to the surface of the pretreated mold base material, more preferably via its hydrophilic end.

Binder

Preferably, the binder is notable for the following features:
  It comprises at least one water-soluble binder component.
  It comprises at least one water-insoluble binder component.
  It comprises water or an aqueous solution, more particularly an aqueous alkaline solution.
  The binder optionally also comprises at least one additive that influences its processing properties as, for example, polyethylene glycol, a wetting agent such as sodium 2-ethylhexyl sulfate (Sulfetal), a surfactant (Byk) or a rheological additive.

It is preferred for the water-soluble binder component to comprise at least one member from the group of waterglass, magnesium sulfate, phosphate and borate.

Waterglasses is a term both for glasslike, water-soluble alkali metal silicates solidified from a melt, more particularly sodium, potassium and lithium silicates, and for their aqueous solutions. Sodium waterglasses are especially suitable. It is also possible to use a mixture of two or more different waterglasses.

One characteristic feature of the waterglasses is their modulus, by which is meant the molar ratio $SiO_2:M_2O$ in the waterglass, where M is preferably selected from $L^+$, $K^+$ or $Na^+$. Preferred is the use of waterglasses having a modulus of 1.2 to 4.5, more preferably 1.5 to 3.3.

GB 782 205 A describes an alkali metal waterglass that is a suitable binder as well and which can be cured by introduction of $CO_2$. Further suitable waterglass-based binders are known from, for example, DE 199 25 167 A1, DE 10 2007 045 649 A1 or U.S. Pat. No. 5,474,606 A.

Borates are salts or esters of boric acids. Boric acid itself can be counted among the borates, and is often also referred to as trihydrogen borate. The salts are characterized in that they include in their ionic lattice, as an anion, the borate ion $BO_3^{3-}$ and/or a condensed form thereof (for example, $B_4O_5(OH)_4^{2-}$, tetraborate).

As phosphates it is possible to use not only conventional phosphates such as ammonium phosphate but also, in particular, polyphosphates and hydrogenphosphates such as sodium hydrogenphosphate.

Polyphosphates are, as is known, condensation products of salts of ortho-phosphoric acid ($H_3PO_4$) with the general empirical formula $M_{n+2}P_nO_{3n+1}$ and the structure M-O—[P(OM)(O)—O]$_n$-M, where M is a monovalent metal and n may easily be a number with up to three or even four digits. Also included among the polyphosphates very frequently, however, are the short-chain (that is, really oligo-) phosphates, for which n can, for example, be a number from 8 to 32. Cyclic polymers are referred to as metaphosphates.

Binders suitable for use and based on polyphosphate and/or borate are described in WO 92/06808 A1, for example. Further suitable phosphate-based binders are known from DE 103 59 547 B3, DE 195 25 307 A1 or U.S. Pat. No. 5,711,792 A.

Particularly preferably, the phosphate in the binder comprises sodium hexametaphosphate (($NaPO_3)_6$).

The water-insoluble binder component preferably comprises at least one member from the group of particulate silicon dioxide, more particularly particulate amorphous silicon dioxide, and particulate calcium carbonate.

The fact that the addition of silicon dioxide to a molding mixture with a waterglass-based binder may be advantageous is known from DE 2434431 A1 of E.I. du Pont de Nemours and Co. As a result of the addition, it is possible to achieve a marked increase in the strength of waterglass-bound molds and cores.

The particulate silicon dioxide is used preferably as a suspension in water, more particularly as a colloidal aqueous suspension. The suspension used in this example preferably has a solids content of 10 wt % to 80 wt % (based on the total mass of the suspension used).

Particularly preferably, the suspension is a suspension of particles produced by condensation preferably of low molecular mass silica. Alternatively, the particulate silicon dioxide may have been produced in another way, by flame pyrolysis from silicon tetrachloride, for example. Natural amorphous silicas as well, examples being those described in DE 10 2007 045 649 A1, may be used.

The particulate silicon dioxide preferably has a mean particle diameter (d50) of 5 nm to 1.5 μm, more preferably 10 nm to 1 μm.

The production of colloidal suspensions of particles by condensation of low molecular mass silica is a known procedure. Low molecular mass silicas such as monosilica (orthosilica), disilica or trisilica tend toward condensation, especially under acidic or basic conditions. When these low molecular mass silicas condense, the desired colloidal suspensions are formed. These suspensions are freely available commercially with a very wide variety of different mean particle sizes.

Particles and colloidal suspensions used with particular preference are prepared starting from pure monosilica.

The binder is more preferably formed by combining the following components in the following fractions:
  The at least one water-soluble binder component in a fraction of 40 wt % to 99 wt %, more particularly 50 wt % to 80 wt %.
  The at least one water-insoluble binder component in a fraction of 1 wt % to 40 wt %, more particularly 5 wt % to 30 wt %.
  The water or the aqueous solution, more particularly the aqueous alkaline solution, in a fraction of 10 wt % to 60 wt %.

All of the percentages are based on the added total weight of all components of the binder including the water or the aqueous solution. The fractions of the components add up to 100 wt %.

Application Variants

In principle it is possible to provide the binder in the form of a mixture of all of its constituents and to apply this mixture to the layer of the pretreated particulate mold base material. Particularly preferably, however, at least one component of the binder is present as stationary binder component in the layer of the mold base material. Only the remaining components of the binder are applied in liquid form to the layer.

According to a first preferred method variant, the stationary binder component comprises the water-insoluble binder component or one of the water-insoluble binder components. With particular preference the mold base material in this example is pretreated with the stationary binder component. Thus, for example, it is possible to mix the mold base material with the colloidal aqueous silicon dioxide suspension described, before forming a layer of the mold base material, to which the remaining components of the binder (for example, a waterglass) are then applied in liquid form, in particular via the aforementioned printing head or heads.

The at least one binder component applied in liquid form to the layer preferably comprises at least one member from the group with water, an aqueous hydroxide solution (more particularly sodium or potassium hydroxide), a waterglass solution, an aqueous solution of magnesium sulfate, an aqueous phosphate solution and an aqueous borate solution, depending on the particular binder used.

According to a second preferred method variant, the stationary binder component comprises the water-soluble binder component or one of the water-soluble binder components. In this example as well, with particular preference, the mold base material is pretreated with the stationary binder component. Thus, it is possible, for example, to mix the mold base material with waterglass as binder component, before forming a layer of mold base material, to which the remaining components of the binder (for example, the colloidal aqueous silicon dioxide suspension described) are then applied in liquid form.

Hot-Curing and Self-Curing Method Variants

Depending on the binder used, it may be preferable, after application of the binder or of the at least one component of the binder to the layer, to cure the binder. For this in particular the following procedures are available for selection:
  The curing takes place by microwave radiation.
  The curing takes place chemically, more particularly by $CO_2$ or of a self-curing additive.
  The curing takes place thermally.

A heat-curing method variant of this kind may be advantageous, for example, under the following conditions:
  The mold base material is a sand treated with the alkylsilanolate, more particularly with potassium methylsiliconate.
  A waterglass solution is applied as liquid binder component to the layer.

In this example, there is preferably a cure by microwave radiation. Especially when producing cores or molds for casting applications, it may be preferable for the abovementioned particulate silicon dioxide to be present as stationary binder component in the layer of the mold base material.

In the majority of preferred examples of our methods, however, the binder is selected such that self-curing is possible. Two particularly preferred self-curing method variants are described below:

In one variant (1) with self-curing binder:
  the mold base material is a sand treated with a silicon-organic compound according to formula (I),
  an ester curing agent such as, for example, diacetin or triacetin is present as stationary binder component in the layer of the mold base material, and
  the waterglass solution is applied as liquid binder component to the layer.

With this method variant as well there is no need to cure by microwave (instead, curing is accomplished by sol-gel conversion as a result of curing agent, without using thermal energy), and here as well it may be preferable, when producing cores or molds for casting applications, for the abovementioned particulate silicon dioxide to be present as stationary binder component in the layer of the mold base material.

In one variant (2) with self-curing binder:
  the mold base material is a sand treated with a silicon-organic compound according to formula (I),
  the waterglass is present as stationary binder component in the layer of the mold base material, and
  an ester curing agent, for example, diacetin or triacetin, is applied as constituent of a liquid binder component to the layer.

With this method variant as well there is no need for curing by microwave (instead, curing is accomplished by sol-gel conversion as a result of curing agent, without using thermal energy), and here as well it may be preferable, when producing cores or molds for casting applications, for the abovementioned particulate silicon dioxide to be present as stationary binder component in the layer of the mold base material.

Molds and Cores Produced by the Method

Molds and cores produced by the method have a fraction of the silicon-organic compound, more particularly of 0.01 to 0.09 wt %.

Preferably, moreover, they are notable for one of the following, or a combination of the following, features:
  the molds and cores comprise at least one member from the group of magnesium sulfate, phosphate and borate, more particularly in a fraction of 0.3 to 2.5 wt %, more preferably 0.5 to 1.0 wt %, and
  the molds and cores comprise particulate silicon dioxide with a mean particle diameter (d50) of 5 nm to 1.5 µm, more particularly in a fraction of 0.1 to 1.0 wt %.

Set for Manufacturing Molds and Cores

The set always comprises the following components:
  at least one silicon-organic compound having a polar hydrophilic end and a nonpolar hydrophobic end, and
  at least one member from the group with waterglass, magnesium sulfate, phosphate and borate.

The two components are generally present separately from one another in the set.

Preferably, the set further comprises at least one of the following components:
- a particulate mold base material,
- at least one member from the group of silicon dioxide and calcium carbonate, and
- an aqueous hydroxide solution.

Preferably, the solid components from among those additional components stated are already mixed with the particulate mold base material.

Further features and advantages are apparent from the working examples below, by which our methods are illustrated. The example described below serves merely for illustration and a better understanding, and should in no way be interpreted as imposing any limitation.

(1) Provision of a Particulate Mold Base Material Pretreated with Potassium Methylsiliconate 99.98 Parts by weight of sand of type GS14 from STROBEL QUARZSAND GmbH based in Freihung, Germany (mean graining=0.13 mm; theoretical specific surface area=176 cm$^2$/g) were admixed with 0.02 part by weight of an aqueous solution with a 34 wt % fraction of potassium methylsiliconate, and thorough mixing was carried out.

(2) Provision of a Particulate Mold Base Material Pretreated with 3-(polyoxyethylene)propylheptamethyltrisiloxane 99.98 Parts by weight of sand of type GS14 from STROBEL QUARZSAND GmbH based in Freihung, Germany (mean graining=0.13 mm; theoretical specific surface area=176 cm$^2$/g) were admixed with 0.02 part by weight of 3-(polyoxyethylene)propylheptamethyltrisiloxane, and thorough mixing was carried out.

(3) Provision of a Printable, Waterglass-Containing Binder Component

As the waterglass-containing binder component, Betol 50T (aqueous solution of modified sodium silicate with a modulus of 2.6 and a solids fraction of 44 wt % (Woellner GmbH & Co. KG, Ludwigshafen, Germany)) was mixed with water and optionally a small fraction of a surfactant.

(4) Provision of a Water-Insoluble Binder Component

As the first water-insoluble binder component, an amorphous SiO$_2$ powder of synthetic origin having a mean particle size of 0.1 to 0.3 μm was provided.

(5) Production of a Core with Self-Curing Binder

To produce a core for aluminum casting, 99 parts by weight of the mold base material pretreated in (2) were mixed with 1 part by weight of the SiO$_2$ powder provided in (4). A layer was formed from the mixture. This layer was subsequently compacted. The layer formed had a uniform layer thickness of 0.2 mm to 0.5 mm. In regions atop this layer, the waterglass-containing binder component provided in (3) was applied by printing. After printing had taken place, a new layer of the mixture was formed on the printed layer and was compacted to a layer thickness within the stated range. This layer too was again printed with the waterglass-containing binder component provided in (3). This procedure was repeated until the desired core had been completed. This core was cured by microwave radiation.

The cured core fulfilled geometric shape specifications much better than a core fabricated under comparable conditions using untreated mold base material.

The invention claimed is:

1. A method of manufacturing molds and cores suitable for producing fiber composite bodies or cast parts of metal or plastic from a particulate mold base material and a multicomponent binder by 3D printing, the method comprising:

a. pretreating the particulate mold base material with at least one silicon-organic compound having a polar hydrophilic end and a nonpolar hydrophobic end, wherein
      the particulate based material is selected from the group consisting of sand, glass, oxidic, ceramic and glass-ceramic materials, and mixtures thereof,
      the polar hydrophilic end of the silicon-organic compound comprises a hydroxyl (—OH), a hydroxylate (—O$^-$), an amino (—NH$_2$), an ammonium (—NH$_4^+$), a carboxyl (—COOH) or a carboxylate group; and
      the nonpolar hydrophobic end of the silicon-organic compound comprises at least one alkyl group selected from the group consisting of methyl, ethyl, and propyl;
   b. forming a layer of the pretreated particulate mold base material, and
   c. applying the binder or at least one component of the binder in liquid form to the layer, wherein b. and c. are repeated; wherein the binder comprises at least one member selected from the group consisting of waterglass, magnesium sulfate, phosphate, and borate.

2. The method as claimed in claim 1, further comprising at least one of:
   the mold base material comprises a particulate material to whose surface the hydrophilic end of the silicon-organic compound is able to attach,
   the mold base material comprises at least one water-insoluble, inorganic material,
   the at least one water-insoluble inorganic material is selected from the group consisting of sand, glass, oxidic, ceramic and glass-ceramic materials, and mixtures thereof,
   the mold base material comprises at least one water-soluble, inorganic material,
   the at least one water-soluble inorganic material is a water-soluble salt,
   the mold base material comprises at least one water-soluble, organic material,
   the at least one water-soluble organic material is a water-soluble polymer or a salt of an organic acid, or a mixture thereof,
   the particulate mold base material has a mean particle diameter (d50) of 10 μm to 800 μm, and
   the particulate mold base material has a surface area as determined by DIN-ISO 9277 of 50 cm$^2$/g to 500 cm$^2$/g.

3. The method as claimed in claim 1, further comprising at least one of:
   a polar hydrophilic end of the silicon-organic compound comprises a hydroxyl (—OH), a hydroxylate (—O$^-$), an amino (—NH$_2$), an ammonium (—NH$_4^+$), a carboxyl (—COOH) or a carboxylate group,
   a nonpolar hydrophobic end of the silicon-organic compound comprises at least one alkyl group selected from the group consisting of methyl, ethyl, and propyl,
   the polar, hydrophilic and the nonpolar, hydrophobic end are bonded to the same Si atom,
   the silicon-organic compound used comprises an alkylsilanolate or an alkali metal methylsilanolate,
   the nonpolar, hydrophobic end of the silicon-organic compound is bonded to an Si atom and the hydrophilic end is bonded to a C atom, the Si atom and the C atom are connected via a chain with n atoms, where n is an integer of 1 to 150 and the atoms are selected from C atoms and O atoms and Si atoms, and the silicon-organic compound comprises a compound with structural formula (I):

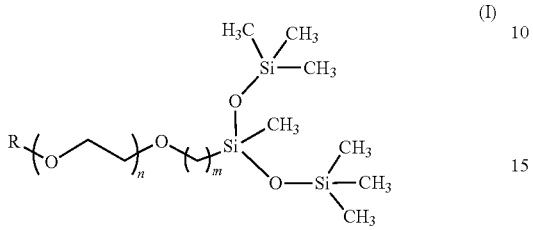

where n is an integer of 1 to 100 and m is an integer of 1 to 10 and R is an H atom, and the silicon-organic compound comprises 3-(polyoxyethylene)propylheptamethyltrisiloxane.

4. The method as claimed in claim 1, further comprising at least one of:
the binder comprises at least one water-soluble binder component,
the water-soluble binder component comprises at least one member selected from the group consisting of waterglass, magnesium sulfate, phosphate, and borate,
the binder comprises at least one water-insoluble binder component,
the water-insoluble binder component comprises at least one member from the group with particulate silicon dioxide and calcium carbonate,
the binder comprises water or an aqueous solution or an aqueous alkaline solution, and
the binder comprises an additive that influences its processing properties.

5. The method as claimed in claim 1, further comprising at least one of:
at least one binder component is present as a stationary binder component in the layer of the mold base material,
the stationary binder component is the water-insoluble binder component or one of the water-insoluble components,
the stationary binder component is the water-soluble binder component or one of the water-soluble components,
the mold base material has been pretreated with the stationary binder component, and
the at least one binder component applied in liquid form to the layer comprises at least one member selected from the group consisting of water, an aqueous hydroxide solution, a waterglass solution, an aqueous solution of magnesium sulfate, an aqueous phosphate solution, and an aqueous borate solution.

6. The method as claimed in claim 1, further comprising at least one of:
after application of the binder or the at least one component of the binder to the layer, the binder is cured,
the curing takes place by microwave radiation,
the curing takes place chemically, and
the curing takes place thermally.

7. A method of manufacturing molds and cores suitable for producing fiber composite bodies or cast parts of metal or plastic from a particulate mold base material and a multicomponent binder by 3D printing, the method comprising:
a. pretreating the particulate mold base material with at least one silicon-organic compound having a polar hydrophilic end and a nonpolar hydrophobic end,
b. forming a layer of the pretreated particulate mold base material, and
C. applying the binder or at least one component of the binder in liquid form to the layer,
wherein b. and c. are repeated;
further comprising:
for the pretreating step, the silicon-organic compound is added to the particulate mold base material in an amount such that it is present in the pretreated mold base material in a weight fraction of at least 0.01 wt % and of at most 0.2 wt % based on a dry weight of the pretreated mold base material.

8. A method of manufacturing molds and cores suitable for producing fiber composite bodies or cast parts of metal or plastic from a particulate mold base material and a multicomponent binder by 3D printing, the method comprising:
a. pretreating the particulate mold base material with at least one silicon-organic compound having a polar hydrophilic end and a nonpolar hydrophobic end,
b. forming a layer of the pretreated particulate mold base material, and
c. applying the binder or at least one component of the binder in liquid form to the layer, wherein b. and c. are repeated;
further comprising at least one of:
at least one binder component is present as a stationary binder component in the layer of the mold base material,
the stationary binder component is the water-insoluble binder component or one of the water-insoluble components,
the stationary binder component is the water-soluble binder component or one of the water-soluble components,
the mold base material has been pretreated with the stationary binder component, and
the at least one binder component applied in liquid form to the layer comprises at least one member selected from the group consisting of water, an aqueous hydroxide solution, a waterglass solution, an aqueous solution of magnesium sulfate, an aqueous phosphate solution, and an aqueous borate solution;
wherein:
the mold base material is a sand treated with an alkylsilanolate or potassium methylsiliconate,
optionally for a casting application, silicon dioxide is present as a stationary binder component in the layer of the mold base material,
waterglass solution is applied as a liquid binder component to the layer, and
a curing takes place by microwave radiation.

9. A method of manufacturing molds and cores suitable for producing fiber composite bodies or cast parts of metal or plastic from a particulate mold base material and a multicomponent binder by 3D printing, the method comprising:
a. pretreating the particulate mold base material with at least one silicon-organic compound having a polar hydrophilic end and a nonpolar hydrophobic end, b. forming a layer of the pretreated particulate mold base material, and
c. applying the binder or at least one component of the binder in liquid form to the layer, wherein b. and c. are repeated;

wherein the particulate mold base material further comprises at least one of:
- a polar hydrophilic end of the silicon-organic compound comprises a hydroxyl (—OH), a hydroxylate (—O$^-$), an amino (—NH$_2$), an ammonium (—NH$_4^+$), a carboxyl (—COOH) or a carboxylate group,
- a nonpolar hydrophobic end of the silicon-organic compound comprises at least one alkyl group selected from the group consisting of methyl, ethyl, and propyl,
- the polar, hydrophilic and the nonpolar, hydrophobic end are bonded to the same Si atom,
- the silicon-organic compound used comprises an alkylsilanolate or an alkali metal methylsilanolate,
- the nonpolar, hydrophobic end of the silicon-organic compound is bonded to an Si atom and the hydrophilic end is bonded to a C atom,
- the Si atom and the C atom are connected via a chain with n atoms, where n is an integer of 1 to 150 and the atoms are selected from C atoms and O atoms and Si atoms, and
- the silicon-organic compound comprises a compound with structural formula (I):

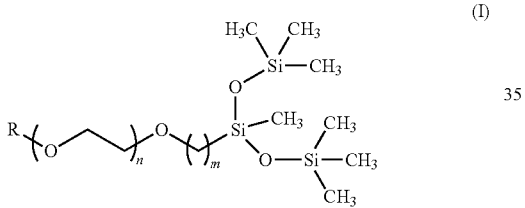

(I)

where n is an integer of 1 to 100 and m is an integer of 1 to 10 and R is an H atom, and the silicon-organic compound comprises 3-(polyoxyethylene)propylheptamethyltrisiloxane;

wherein:
- the mold base material is a sand treated with the silicon-organic compound according to formula (I),
- optionally the silicon dioxide is present as a stationary binder component in the layer of the mold base material,
- an ester curing agent is present as a curing agent as a stationary binder component in the layer of the mold base material, and
- the waterglass solution is applied as a liquid binder component to the layer.

10. A method of manufacturing molds and cores suitable for producing fiber composite bodies or cast parts of metal or plastic from a particulate mold base material and a multicomponent binder by 3D printing, the method comprising:

a. pretreating the particulate mold base material with at least one silicon-organic compound having a polar hydrophilic end and a nonpolar hydrophobic end,
b. forming a layer of the pretreated particulate mold base material, and
c. applying the binder or at least one component of the binder in liquid form to the layer, wherein b. and c. are repeated;

wherein the particulate mold base material further comprises at least one of:
- a polar hydrophilic end of the silicon-organic compound comprises a hydroxyl (—OH), a hydroxylate (—O$^-$), an amino (—NH$_2$), an ammonium (—NH$_4^+$), a carboxyl (—COOH) or a carboxylate group,
- a nonpolar hydrophobic end of the silicon-organic compound comprises at least one alkyl group selected from the group consisting of methyl, ethyl, and propyl,
- the polar, hydrophilic and the nonpolar, hydrophobic end are bonded to the same Si atom,
- the silicon-organic compound used comprises an alkylsilanolate or an alkali metal methylsilanolate,
- the nonpolar, hydrophobic end of the silicon-organic compound is bonded to an Si atom and the hydrophilic end is bonded to a C atom,
- the Si atom and the C atom are connected via a chain with n atoms, where n is an integer of 1 to 150 and the atoms are selected from C atoms and O atoms and Si atoms, and
- the silicon-organic compound comprises a compound with structural formula (I):

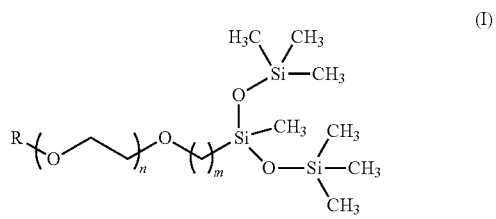

(I)

where n is an integer of 1 to 100 and m is an integer of 1 to 10 and R is an H atom, and the silicon-organic compound comprises 3-(polyoxyethylene)propylheptamethyltrisiloxane;

wherein:
- the mold base material is a sand treated with the silicon-organic compound according to formula (I),
- optionally the silicon dioxide is present as a stationary binder component in the layer of the mold base material,
- the waterglass is present as a stationary component of the binder in the layer, and
- an ester curing agent is applied as liquid binder component to the layer.

* * * * *